3,208,284
GAS MANOMETER
Benito Muguira Rivero, 10 de Octubre 1568,
Havana, Cuba
Filed July 1, 1960, Ser. No. 40,244
3 Claims. (Cl. 73—395)

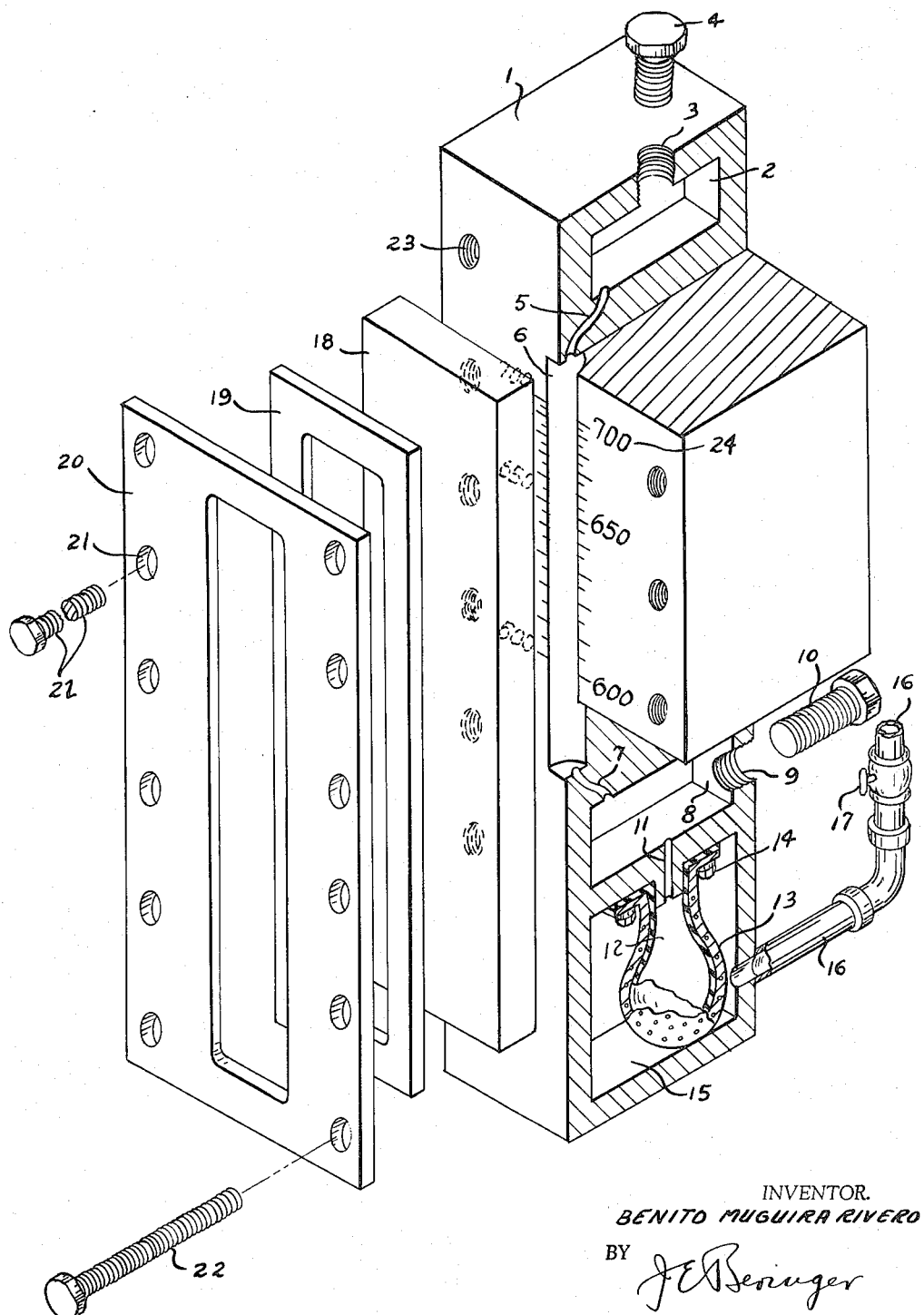

This invention is intended as an improvement of manometers, barometers and similar instruments, as to make them more accurate, of simple construction and adequate for calibrating other manometers of a different type of mechanism. Their operation is based in the nature and behaviour of the so-called perfect gases, that according to Boyle's law the volume of a given gas, at constant temperature, is inversely proportional to its pressure. Thus said manometers consist of an apparatus that gives a reading of the volume of a fixed quantity of gas, under the effect of the pressure to be measured, which reading may be read directly in any desired units or increments of pressure.

This invention is also intended to produce manometers and barometers that do not depend on the deformation of elastic matter and mechanical movement of gears and parts, thus avoiding the natural and normal wear of parts inherent to such mechanical manometers which lose accuracy and do require more maintenance attention.

Other points and objects of originality and invention will be apparent in the specifications, making reference to the drawing, which is:

A view, drawn in isometric projection, representing the component parts of a manometer with confined gas under pressure.

With reference to the drawing, this figure shows a part of the material cut away, on top and bottom, at the right, with the purpose of simplifying the explanation of the operation of the manometer represented. In the upper part of the steel block 1 there is an inside chamber 2 provided to contain or hold a predetermined amount of a suitable gas. This chamber 2 communicates to the atmosphere through a threaded hole 3 where a screw or cap 4 fits, and this chamber 2 is also communicated through an orifice 5 to a vertical slot 6. The vertical slot 6 communicates through another orifice 7 with another chamber 8 which is to be filled with mercury, or any other suitable liquid, and this other chamber 8 is communicated to the atmosphere through an threaded hole 9 where a screw or cap 10 fits. The chamber 8 also communicates through an orifice 11 with a bag 12, made of rubber or any other suitable material, this rubber bag being covered by a metallic bag-shaped container 13 perforated with many small holes. Both, the metallic and rubber bag, are flanged at the mouth or opening so that they may be held in place by means of screws 14. Both of these bags 12 and 13 are inside of a pressure chamber 15 which receives through proper pipes 16 the pressure to be measured, when a cock 17 is opened. Over the vertical slot 6 a glass plate 18 is placed with a suitable gasket 19 to cover the vertical slot 6. Over this gasket 19 a metallic plate 20 is placed to hold the glass plate in its position over the vertical slot 6. This metallic plate 20 has several holes 21 drilled, to hold it in place by means of screws 22 which are screwed into the threaded holes 23 made in the steel block 1. By the side of the vertical slot 6 a suitable scale 24 is marked with readings of increments of pressure.

To operate this manometer, the rubber bag 12 is filled with mercury, or any other suitable liquid, to any desired level, say, up to be flush with the upper part of orifice 7. The screw 10 simplifies obtaining the desired level, by screwing or unscrewing it, as may be necessary. If so desired, this screw 10 may be omitted. Chamber 15 and piping 16 should also be filled with mercury. The height of the mercury inside the pipes 16 depends on the water column suported by the manometer, as is the case in manometers that measure boilers steam drum pressure that if the manometer is below the drum level a correction in the manometer must be made. Providing the correct height of mercury inside the pipes 16 the manometer will take into account any difference in levels between the manometer and the head of the liquid. To fill the chamber 15 with mercury, it is necessary to make a small orifice to let the air out and then the orifice is closed by welding, or closed in any other practical way. The cock 17 will keep the mercury from pouring out while the manometer is not installed. The chamber 2 must be filled with a predetermined amount of gas at a predetermined pressure. The adjustment of the volume and the pressure of this gas (at constant temperature) may be obtained by means of screwing or unscrewing screw 4 as required. The glass plate 18 mounted on the vertical slot 6 keeps the gas from leaking out. In this manner the manometer is ready to be shipped and used.

Once the manometer is installed the cock 17 is opened to let the pressure to be measured act on the rubber bag 12 which is in chamber 15. While this pressure is lower than the pressure of the gas inside the manometer no reading will be obtained, because the gas inside the manometer will exert a pressure inside of the rubber bag 12 pressing that rubber bag against the metallic bag 13 without inflating or bursting the rubber bag 12 if the perforations of the metallic bag 13 are sufficiently small. When the pressure inside the chamber 15 increases to a larger pressure than that of the gas in the manometer, the mercury contained in this chamber 15 will pass through the holes of the perforated bag 13 pressing the rubber bag 12 and reducing the volume of the rubber bag and forcing the mercury to go up into the vertical slot 6 making it possible to take a reading, that will be taken directly as a pressure reading on the pressure scale 24 by looking through the glass plate 18. As the mercury goes up the vertical slot 6 the volume of the gas inside the manometer will be reduced, and the pressure of this gas will be increased according to Boyle's law, previously described. The volume of the gas inside the manometer will be reduced until the pressure of this gas is in equilibrium with the pressure exerted on the rubber bag 12 and the mercury will not then move up or down in the vertical slot 6 until a pressure change takes place in the lower chamber 15. It may be observed that this manometer has two limits, a minimum and a maximum reading, not being able to give readings below or above these maximum and minimum readings. But the gas manometer may be used when the pressure to be measured falls within these limits. Let us suppose, for example, that this manometer is installed to a boiler whose working pressure is, say about 650 lbs. per square inch. If the manometer is designed with a minimum reading of 600 lbs. per square inch and a maximum reading of 700 lbs. per square inch, then we may have readings of the boiler's pressure while it is working at its normal pressure, for which the boiler was designed. That is, in spite of the lower limit of 600 lbs. per square inch, we may obtain the pressure readings we need when the boiler is working under normal conditions. If preferred, several manometers may be constructed in a single steel block, as a unit, such that each manometer has different limits covering a large range of readings from atmospheric pressure up to any desired pressure.

It is obvious that a gas manometer can not give a reading of pressure below the pressure of the gas it holds. On the other hand, if the pressure to be measured is many times greater than the pressure of the gas that the manometer contains, the reduction of the volume of the gas will be so much that the manometer would not be very practical either because it would have to be too large or because the scale would show large increments of pressure at some points, thus losing the accuracy which ought to be characteristic to gas manometers. The manometers that are to read low pressures may be filled with gas at atmospheric or below atmospheric pressure, but if a gas manometer is to read large pressures the gas in it should be at a much higher pressure than atmospheric pressure.

The manometer may be filled with a quantity of mercury such that there may be some gas inside chamber 8 having vertical slot 6 and chamber 2 filled with gas. Thus, scale 24 will be marked according to the ratio of gas volume of chambers 2 and 8 and vertical slot 6, depending also on the pressure of the confined gas, at constant temperature. Specific designs will determine the pressure and volume of gas most desirable. The smaller the cross sectional area of vertical slot 6 smaller chambers of gas 2 and 8 will be required, and the smaller the pressure of the confined gas in the manometer when it is not working. The cross sectional area of this vertical slot 6 should be as small as possible, without allowing capillary action introduce an error in the functioning of the apparatus, and this cross sectional area should be uniform along the whole length of the scale on the vertical slot 6. If preferred, this vertical slot 6 may be substituted by a glass tube, or any other suitable material, that would communicate the upper and lower chambers; this being a detail of design does not change the spirit of this invention. To design a gas manometer, as described above, any deviation that the gas confined in the manometer shows from the perfect gas laws must be taken into account. Also, scale 24 may be corrected according to the mercury column at different readings. As long as ambient temperature will effect the manometer's reading, the reading may be corrected by proper tables or by proper formulae. If ambient temperature does not differ very much from the working temperature for which the manometer was designed it will not be necessary to make these corrections for ordinary pressure readings.

A simple and practical way of avoiding the use of tables or formulae to make temperature corrections consists in screwing or unscrewing screws 4 and 10, for which purpose the manometer may be supplied with round plates around these screws, which plates are marked to indicate the position of these screws, at different temperatures. For greater facility in the operation, the screws may be turned with a fixed handle, making unnecessary the use of any tools. Thus, a correction is made to take care of any deviations from the designed pressure of the gas and the volume of the mercury, due to changes in temperature. To measure pressures that require much accuracy, in any justified cases, these manometers may be supplied with a cooling system or any type of insulation that will keep them at nearly constant temperature.

Chamber 2 should be designed such that it will be impossible for this chamber to trap any mercury in it when the manometer is standing upright. This may be accomplished by having the bottom of chamber 2 sloping down to orifice 5. Likely, chamber 8 should be designed as to avoid gas pockets when the manometer is standing upright.

The manometer shown in the drawing can measure the pressure of a fluid at some distance by means of piping 16 through which the pressure is transmitted to the gas manometer. However, it is quite possible to construct a gas manometer, which may be cylindrically shaped, to be screwed directly to the recipient whose inside pressure is to be measured. In this case it may be more practical that the rubber bag and the rigid metallic bag be in direct contact with the fluid whose pressure is to be measured. Also, both, the rubber and metallic bags could be connected to the manometer by means of a long flexible tube capable of standing pressure such that both bags could be installed directly in the pressure recipient, the rest of the gas manometer could be conveniently installed in a suitable panel, these minor changes not affecting its basic principle of operation based on the compression of a gas. That is the spirit of this invention is irrespective of the design of the manometer, which depends on the desired installation. If preferred, the rigid bag 13 may be constructed with suitable wire mesh shaped in any practical manner.

Having described all the essential parts of gas manometers I wish to point out that constructional details may be varied, and these changes will not change the spirit of this invention, which is as claimed below.

I claim:

1. A gas manometer or like device, including a body, an elongated indicator passage in said body, three separated inflexible chambers in said body, an orifice opening connecting each end of said indicator passage to first and second chambers respectively, another orifice opening connecting said second chamber to said third chamber, said first chamber being filled with a gas under pressure and said second and third chambers being filled with a liquid, a flexible liquid filled container in said third chamber mounted to said body to have its interior exclusively communicating through the said other orifice opening with said second chamber, and means for admitting pressure to said third chamber.

2. A gas manometer or like device according to claim 1, characterized by a relatively inflexible perforate cover for said flexible container limiting expansion thereof in the presence of a pressure in said third chamber lower than the gas pressure in said first chamber.

3. A gas manometer or like device, including a panel presenting an elongated indicator passage, means defining a chamber filled with a gas under pressure and communicating with said indicator passage at one end thereof, a flexible liquid filled container having its interior communicating with said indicator passage at the other end thereof, means defining a chamber of variable pressure receiving said container, and a relatively inflexible perforate cover for said flexible container limiting expansion thereof in the presence of a pressure in said chamber of variable pressure lower than the pressure in the first said gas filled chamber.

References Cited by the Examiner
UNITED STATES PATENTS

| | | | |
|---|---|---|---|
| 192,373 | 6/77 | Johnson | 73—401 |
| 232,322 | 9/80 | Allan | 73—401 |
| 874,517 | 12/07 | Lowry | 73—406 |
| 931,348 | 8/09 | Schulz | 73—401 X |
| 1,055,827 | 3/13 | Spencer | 73—406 |
| 1,664,265 | 3/28 | Rieber | 73—401 X |
| 1,894,366 | 1/33 | Cantacuzene | 73—393 |
| 2,434,837 | 1/48 | Cornelt | 73—401 |
| 2,650,607 | 9/53 | Bryant | 73—393 |

RICHARD C. QUEISSER, *Primary Examiner.*

C. A. CUTTING, ROBERT L. EVANS, JOSEPH P. STRIZAK, *Examiners.*